(12) United States Patent
Berginc et al.

(10) Patent No.: US 8,228,584 B2
(45) Date of Patent: Jul. 24, 2012

(54) PASSIVE OPTICAL LIMITER HAVING NONLINEAR MATERIAL

(75) Inventors: Gerard Berginc, Thials (FR); Patrick Feneyrou, Igny (FR); Pierre-Antoine Bouit, Lamastre (FR); Olivier Maury, Brindas (FR); Marie-Chantal Andraud, Genas (FR)

(73) Assignee: Ecole Normale Superieure de Lyon, Thales (FR)

( * ) Notice: Subject to any disclaimer, the term of this patent is extended or adjusted under 35 U.S.C. 154(b) by 339 days.

(21) Appl. No.: 12/706,930

(22) Filed: Feb. 17, 2010

(65) Prior Publication Data

US 2010/0213356 A1 Aug. 26, 2010

(30) Foreign Application Priority Data

Feb. 24, 2009 (FR) ...................... 09 00834

(51) Int. Cl.
*G02F 1/23* (2006.01)
(52) U.S. Cl. ...................... 359/241
(58) Field of Classification Search .............. 359/241, 359/321; 250/226
See application file for complete search history.

(56) References Cited

U.S. PATENT DOCUMENTS

| | | | |
|---|---|---|---|
| 5,561,541 A | 10/1996 | Sharp et al. | |
| 5,950,237 A | 9/1999 | Micheron et al. | |
| 6,531,699 B1 | 3/2003 | Micheron et al. | |
| 6,970,622 B1 | 11/2005 | Taravade | |
| 7,581,441 B2 | 9/2009 | Barny et al. | |
| 2008/0312539 A1* | 12/2008 | Dorshow et al. | 600/476 |

FOREIGN PATENT DOCUMENTS

WO 2008/061961 A2 5/2008

OTHER PUBLICATIONS

Pierre-Antoine Bouit, et al., "Two-Photon Absorption-Related Properties of Functionalized BODIPY Dyes in the Infrared Range up to Telecommunication Wavelengths", Advanced Materials, Mar. 20, 2009, pp. 1151-1154, vol. 21, No. 10-11, Wiley-Vch Verlag GmbH.
Weili Zhao, et al., "Conformationally Restricted Aza-BODIPY: Highly Flourescent, Stable Near-Infrared Absorbing Dyes", Chemistry—A European Journal, Sep. 18, 2006, pp. 7254-7263, vol. 12, No. 27, Wiley-VCH Verlag GmbH.
Pierre-Antoine Bouit, et al., "Near Ir Nonlinear Absorbing Chromophores with Optical Limiting Properties at Telecommunication Wavelengths", Chem. Mater., May 10, 2007, pp. 5325-5335, vol. 19, online—http://pubs.acs.org.
Guang S. He, et al., "Multiphoton Absorbing Materials: Molecular Design, Characterizations, and Applications", Chem. Rev., Mar. 25, 2008, pp. 1245-1330, vol. 108, online—http://pubs.acs.org.

* cited by examiner

*Primary Examiner* — Ricky Mack
*Assistant Examiner* — Tuyen Tra
(74) *Attorney, Agent, or Firm* — Baker & Hostetler LLP

(57) ABSTRACT

The invention relates to a passive optical limiter having a nonlinear material capable of switching in a predetermined optical band from a transparent state to an opaque state as a function of the power of an incident laser beam. The nonlinear material is an organic dye which comprises molecules derived from 4,4-difluoro-4-bora-3a,4a-diaza-s-indacene into which a nitrogen atom is inserted at the meso position, referred to as aza-bodipy molecules, and which have conjugated π chains functionalized so as to exhibit absorption for two photons around an incident beam wavelength lying between 1.45 µm and 1.6 µm.

21 Claims, 4 Drawing Sheets

PASSIVE OPTICAL LIMITER HAVING NONLINEAR MATERIAL

CROSS-REFERENCE TO RELATED APPLICATIONS

This application claims priority to foreign French patent application No. FR 09 00834, filed on Feb. 24, 2009, the disclosure of which is hereby incorporated by reference in its entirety.

BACKGROUND OF THE INVENTION

The field of the invention is that of protecting active imaging systems against stray reflections and/or scattering and against laser attacks.

Active laser imaging is an optronic technique for obtaining images of a scene under laser illumination. An active imaging system comprises:
  a laser source with ocular safety for illuminating the target and the neighbouring scene,
  a mono-detector or a matricial detector sensitive in the operating band of the laser, adapted to detect the beam back-scattered by the illuminated scene,
  the optics and the signal processing necessary for constructing the image of the scene.

The application fields of active imaging are particularly important, notably for defence, security and biomedicine.

Beyond conventional bidimensional imaging, it is possible to acquire mono-dimensional signatures with a very short-pulse laser having ocular safety. These signatures make it possible to identify the object by virtue of the back-reflection of the pulse from the various parts of the object. A very high-resolution signature is thus obtained, allowing the profile of the object to be determined precisely. By using an angular scan of the signature, it is then possible to reconstruct a three-dimensional tomographic image of the objects. These techniques are also used in reflection to reconstruct biological tissue.

Identification by profilometric images, either direct bidimensional or tridimensional for tomographic reconstruction, is possible only if the signal-to-noise ratio received by the detection system is sufficiently high and if the noise sources are greatly reduced.

One particularly important noise source in active systems corresponds to auto-glare of the detector by stray reflections and/or scattering from the lenses of the optical device or from atmospheric layers.

The lasers employed in active imaging systems have a high pulse energy in order to obtain large identification ranges. Any reflection/scattering from the lenses of the emission optics or from the first atmospheric layers therefore increases the risk of dazzling the sensor. Time windowing, or "gating", partially makes it possible to deal with auto-glare of the detectors, but on certain detectors there is a remanence which leads to dazzling of the detection matrix. Furthermore, no civil component makes it possible to fulfil this function in view of the energies and pulse durations which are different from those of telecommunication applications. The techniques of electronic "gating" remain complex to implement, notably for durations less than about ten nanoseconds, and they do not make it possible to deal with destruction of the sensitive parts of the detectors. Eliminating these stray reflections ensures optimal functioning of the system.

In order to overcome atmospheric conditions and improve the resolution in relation to 3-5 µm or 8-12 µm infrared band passive imaging, active imaging systems have been developed in the near IR and particularly in the spectral range centred on 1.5 µm, which makes it possible to construct systems with ocular safety.

In the field of security and defence, these imaging systems can be dazzled or destroyed by a high-power laser source in the same band. The sensitivity of their detection system, and their use at limiting range can expose them to relatively effective dazzling. Specifically, work on lasers emitting around 1.5 µm has led to an increase in the available energy by using quasi-phase-matched materials. In view of their reduced spectral operating width, active imaging systems have increased vulnerability to attacks by these lasers. It is therefore necessary to equip imaging systems with protection of their detection device against these laser attacks.

The devices for active limitation of the transmitted fluxes therefore have twofold interest for active imaging systems at 1.5 µm.

In order to produce such a device, the protective function should be reversible, that is to say the device should become transparent again after a laser attack. It should therefore have a good flux resistance, possibly be insensitive to polarization, should respond for pulses with a duration of a few ns and have an extended protective dynamic range.

Protection devices exist; they use mobile optical filters, optical configurations with separate paths in emission and reception, and specific designs of the readout circuits of the detectors. All these devices have significant drawbacks, notably in terms of:
  response times,
  complexity of the optical systems in terms of cost and size,
  the electronics in terms of development cost.

Other devices have been proposed, which use materials with nonlinear absorption.

Among the various types of nonlinear absorption, two-photon absorption or TPA may be mentioned. This is a process illustrated in FIG. 1, during which two photons are absorbed simultaneously by a material. The molecules change by two-photon absorption from the ground level S0 to an allowed excited level S1, the energy of which corresponds to the sum of the energies of the two incident photons. When the population of the excited state S1 becomes significant, it may be necessary to take into account "linear" absorption from the excited state, which makes the molecule change from the state S1 to the state S2.

In this type of material, when the pulse duration is wide compared with the lifetime of the excited state, the transmission of a material with a length L may be calculated from the following propagation equation:

$$\frac{dI}{dz} = -\alpha^{(1)}I - \alpha^{(2)}I^2 - \alpha^{(3)}I^3$$

where I is the optical illumination (in W m$^{-2}$)

z is the propagation coordinate through the nonlinear material, $\alpha^{(1)}$ is the linear absorption coefficient $\alpha^{(2)}$ is the two-photon absorption coefficient $\alpha^{(3)}$ is the apparent three-photon absorption coefficient which is due to linear absorption from the excited state (absorption following a first step of two-photon absorption). This coefficient is linked with the effective absorption cross section from the excited state $\sigma_{12}$:

$$\alpha^{(3)} = \frac{\alpha^{(2)}\sigma_{12}\tau_1}{h\nu}$$

where $\tau_1$ denotes the lifetime of the excited state S1, and $\tau_2$ denotes that of the excited state S2, hν is the energy of the photon.

In the figure, the effective two-photon absorption cross section from the ground state is denoted $\sigma_{01}$, and the lifetime of the excited state S2 is denoted $\tau_2$.

The materials having nonlinear absorption which are used in the visible band only make it possible to cover a reduced spectral range (typically for a wavelength of between 400 nm and 800 nm), and are not therefore effective up to 1.5 µm. For systems operating around 1.5 µm, the active material may be a semiconductor such as for example AsGa, although its nonlinear TPA is strongly dependent on traps (impurities).

SUMMARY OF THE INVENTION

The invention relates to an optical limiter for protecting active or passive imaging systems against laser attacks, and for reducing their auto-glare due to scattering from the first atmospheric layers of or from the lenses of the optical device. This limiter is based on the use of a family of chromophores (known as aza-bodipys) to produce this protective function.

More precisely, the invention relates to a passive optical limiter which comprises a nonlinear material capable of switching in a predetermined optical band from a transparent state to an opaque state as a function of the power of an incident laser beam. It is principally characterized in that this nonlinear material is an organic dye which comprises molecules derived from 4,4-difluoro-4-bora-3a,4a-diaza-s-indacene into which a nitrogen atom is inserted at the meso position, referred to as aza-bodipy molecules, and which have conjugated π chains functionalized so as to exhibit absorption for two photons around an incident beam wavelength lying between 1.45 µm and 1.6 µm.

The protective function of this limiter is reversible, that is to say the limiter becomes transparent again after a laser attack. It has good flux resistance because these molecules have low dielectric constant values and are thermally stable. The device responds for pulses with a duration of a few ns and has an extended protective dynamic range (ratio between the luminous energy density necessary for obtaining a given attenuation—for example 20%—and the luminous energy density at the optical damage threshold of the material) when the concentration is high. This device may be insensitive to polarization if the active material is incorporated in a solid matrix.

According to a first variant, the conjugated π chains functionalized by electron donor or acceptor groups are introduced into the aza-bodipy molecules at position 1,7 or 3,5. These functional groups are $NMe_2$ (B0), or OHex (B2) or $NHex_2$ (B3) at position 3,5.

Optionally, these functional groups are alkoxyphenyl or dialkylaniline or dialkylaminofluorenyl.

The donor or acceptor groups are identical or different.

According to another variant, heavy atoms are introduced into the aza-bodipy at position 2,6. These heavy atoms are typically halogens such as Cl or Br or I.

According to a third variant, the aza-bodipy molecules are functionalized by a reactive hydroxyl or amino or trimethylsilyl function.

The dye is used in liquid solution or as bulk material obtained by doping a polymer film, or as the active part of a monomer for producing an active polymer film, or by doping a matrix of the sol-gel type, or as the active part of a matrix of the sol-gel type, or as a crystal, or as nanocrystals dispersed in a polymer or sol-gel matrix.

The limiter optionally comprises an optical structure with a resonant cavity, in the middle of which the said aza-bodipy used as bulk material is deposited. This optical structure with a resonant cavity is a photonic crystal, in the middle of which is deposited the said aza-bodipy used as a dopant of a matrix in which the photonic crystal is produced or a multilayer structure comprising a plurality of coupled resonant cavities.

The invention also relates to an optronic system which comprises a reception device equipped with a limiter as described. This system is passive or active; in the latter case, it then comprises a device for emitting a laser beam having a wavelength of between 1.45 and 1.6 µm, and the limiter is adapted to be blocking around the said wavelength.

According to a first configuration, the reception device having a detector, the nonlinear material is deposited on the surface of this detector.

According to other configurations, the reception device having a detector located in a focal plane, the nonlinear material is placed in an intermediate focal plane or in a collimated beam.

BRIEF DESCRIPTION OF THE DRAWINGS

Other characteristics and advantages of the invention will become apparent on reading the following detailed description, given by way of nonlimiting example and with reference to the appended drawings, in which.

From one figure to another, the same elements are identified by the same references.

DETAILED DESCRIPTION

The invention proposes to use a limiter based on a material exhibiting nonlinear absorption in order to avoid destruction and/or dazzling of the detectors used notably for active imaging. This type of limiter is then reversible, and may be directly included in an optical assembly. As a function of the intensity of the incident beam, it will be in blocking or transmitting mode.

Figure 1:
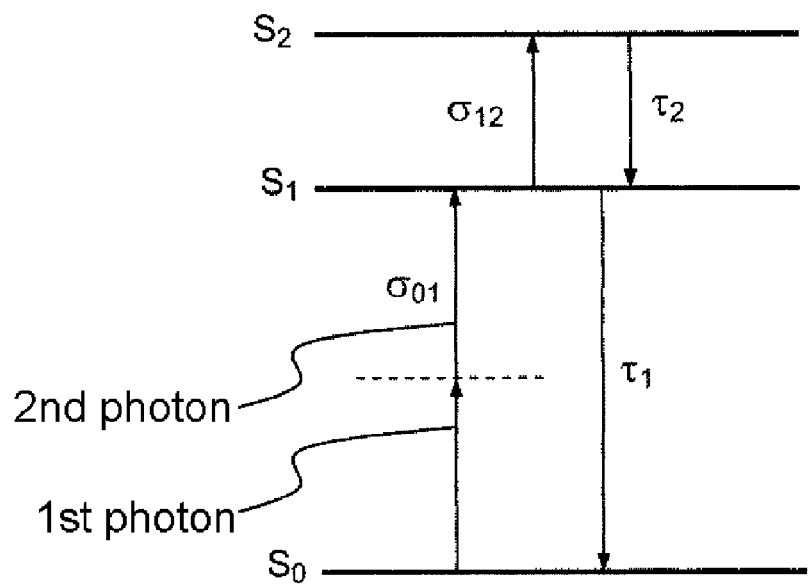
FIG. 1, already described, schematically illustrates the phenomenon of two-photon absorption with re-absorption by the excited state, FIG. 2 schematically represents the general structure of a conventional bodipy, FIG. 3 schematically represents the emission and absorption curves of a conventional aza-bodipy as a function of wavelength, FIG. 4 schematically represents the general structure of a functionalized aza-bodipy, FIG. 5 schematically represents the reaction sequence of the aza-bodipy B0, FIG. 6 schematically represents the reaction sequence of the aza-bodipys B2 and B3, FIG. 7 schematically represents the transmission curve of the aza-bodipy B3, as a function of the fluence of the incident laser beam at λ=1500 nm, FIG. 8a schematically represents a positioning of a limiter with respect to the detector of an optronic system.
Figure 2:
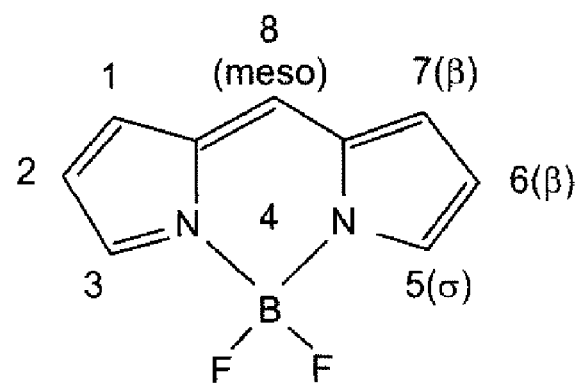

The material used is an organic material of the family of boron dipyrromethenes, synthesized for the first time in 1968, which are 4,4-difluoro-4-bora-3a,4a-diaza-s-indacene derivatives as represented in FIG. 2. The name "Bodipy", which was registered by Molecular Probes, has now become the generic name for this class of molecules. It is therefore a complex between a dipyrromethene unit (two pyrroles joined by a methine bridge) and boron trifluoride. The product formed is a rigidified monomethine, which allows it to combine certain properties of cyanines (intense absorption) with furthermore very high fluorescence quantum efficiencies, often in excess of 80%. For some years, these compounds have been used in very many applications by virtue of their exceptional fluorescence properties: fluorescent probes for biology, molecular switches, photosensitizers used in photodynamic therapy or solar cells.

Figure 3:
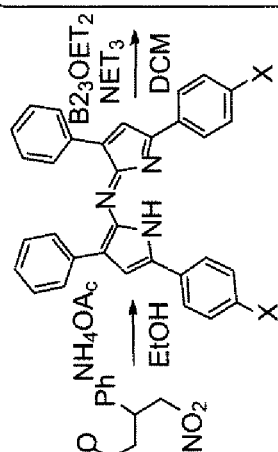
Figure 3:
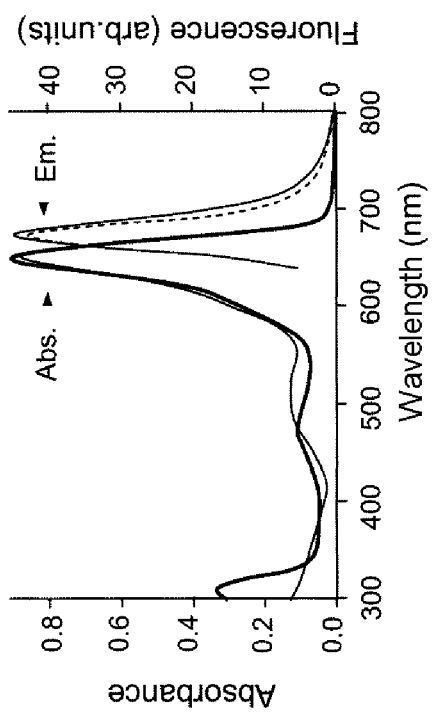

By inserting a nitrogen atom into the bodipy molecule at the meso position, that is to say at the median position, the obtained molecule denoted aza-bodipy has an absorption spectrum similar to that of a conventional bodipy but offset towards red: fine, intense absorption ($\in$=100000 L·mol$^{-1}$ cm$^{-1}$) insensitive to the polarity of the solvent, and moderate fluorescence ($\phi \approx 0.3$) with a small Stokes shift (shift between the emission wavelength and the absorption wavelength) as shown by FIG. 3. The absorption is shifted towards red, typically for $\lambda$ lying between 650 and 700 nm. This bathochromic shift (that is to say towards high wavelengths) of the absorption is due to the presence of non-linking doublets of nitrogen at the meso position.

It will be recalled that the position is that of the branching on the base alkane.

Figure 4:
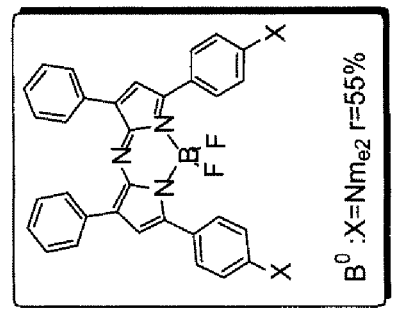
Figure 4:
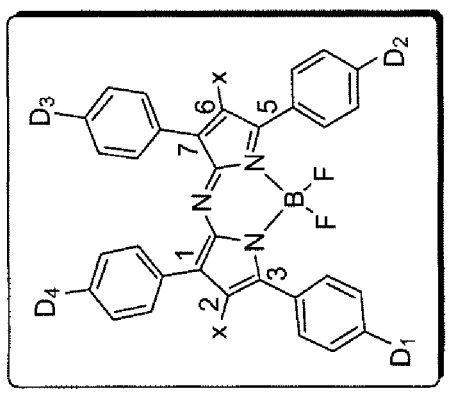

This bathochromic shift may be amplified in various ways as illustrated in FIG. 4:
  by substituting the 1,7 or 3,5 positions of the aza-bodipy with any $\pi$-conjugated aromatic group, which is the most effective strategy illustrated,
  by substituting the 2,6 position with heavy atoms X, such as halogens like Cl, Br and I, in order to optimize the reabsorption in the excited state,
  by functionalizing the aza-bodipy with a reactive function (hydroxyl, amino, trimethylsilyl) with a view to incorporation by grafting into a material of the polymer or sol-gel type.

It will be recalled that the notation "position 1,7" signifies "position 1 and/or 7"; likewise for positions 3,5 and 2,6.

It will also be recalled that a functional group is a submolecular structure consisting of a set of given atoms that imparts a specific function (or reactivity) to the molecule which contains it. An aromatic group is a phenyl or a fluorenyl or a naphthyl or a thiophene or a pyrrole or a silole or a phosphole. A $\pi$ conjugated group is either a succession of aromatic groups, or a succession of double or triple bonds or an alternation of aromatic groups with one or more double and/or triple bonds. These $\pi$ conjugated groups may themselves be functionalized by electron donor or electron acceptor groups.

Some examples of dyes obtained by substituting the 1,7 or 3,5 positions with $\pi$ conjugated aromatic groups will be described.

Figure 5:
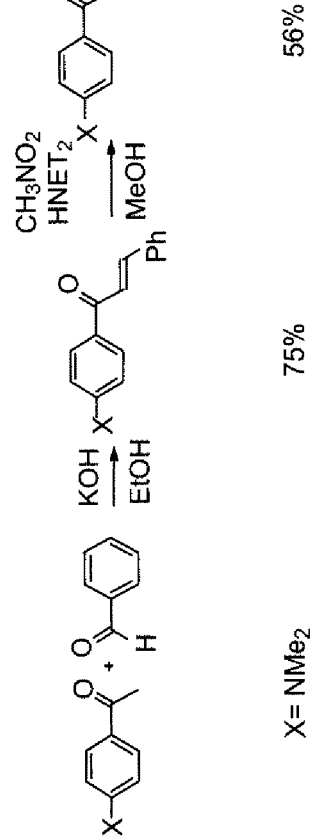

A first example B0 of functionalized aza-bodipy was synthesized according to the reaction sequence described in FIG. 5. The first step consists in ketolization-crotonization in the presence of potassium hydroxide between a para-substituted acetophenone and benzaldehyde; (yield r=75%). Addition on the double bond with nitromethane is subsequently carried out in the presence of diethylamine (r=56%). The key step for the aza-bodipy synthesis is the formation of dipyrromethene. This reaction was carried out in ethanol in the presence of 40 equivalents of ammonium acetate. The dipyrromethene formed precipitates in the reaction medium and is isolated after simple washing with ethanol (r=50%). Sequestration of the boron trifluoride is subsequently carried out in the presence of triethylamine at room temperature in DCM (abbreviation for dichloromethane). The aza-bodipy B0 is isolated after silica column chromatography (r=55%). The functional group of B0 is $NMe_2$.

Figure 6:
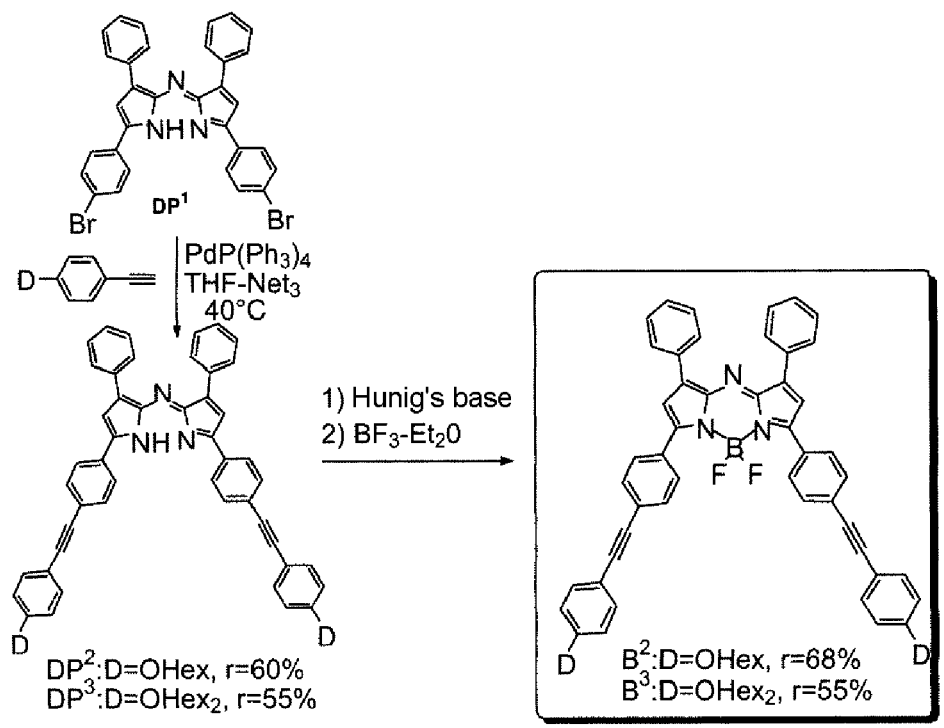

Second and third examples B2 and B3 of functionalized aza-bodipys were synthesized according to the reaction sequence described in FIG. 6. In order to synthesize the desired product, aza-dipyrromethene DP1 was used as a key intermediate. Owing to the presence of the dipyrromethene sequestration site, the following Sonogashira couplings were performed without copper. Reaction of the alkynes functionalized with DP1 overnight at 40° C. in a THF-NEt$_3$ mixture made it possible to synthesize the functionalized dipyrromethenes DP2 (r=41%) and DP3 (r=55%). Complexing of the boron trifluoride in the presence of Hunig's base subsequently made it possible to synthesize the compounds B2 (r=68%) and B3 (r=55%). The functional group of B2 is OHex; that of B3 is NHex.

These values have low dielectric constant values and are thermally stable, which allows them to exhibit a good flux resistance.

The absorption wavelength of these functionalized aza-bodipys is: 790 nm for B0, 686 nm for B2 and 740 nm for B3.

In order to accentuate the bathochromic shift, these molecules B0, B2, B3 are themselves optionally functionalized with acceptor or donor groups denoted D1, D2, D3, D4. For a given aza-bodipy functionalized by these substitutions, these groups D1-D4 may be identical or different.

The functional group D1, D2, D3, D4 is, for example, an alkoxyphenyl or a dialkylaniline or a dialkylaminofluorenyl.

Figure 7:
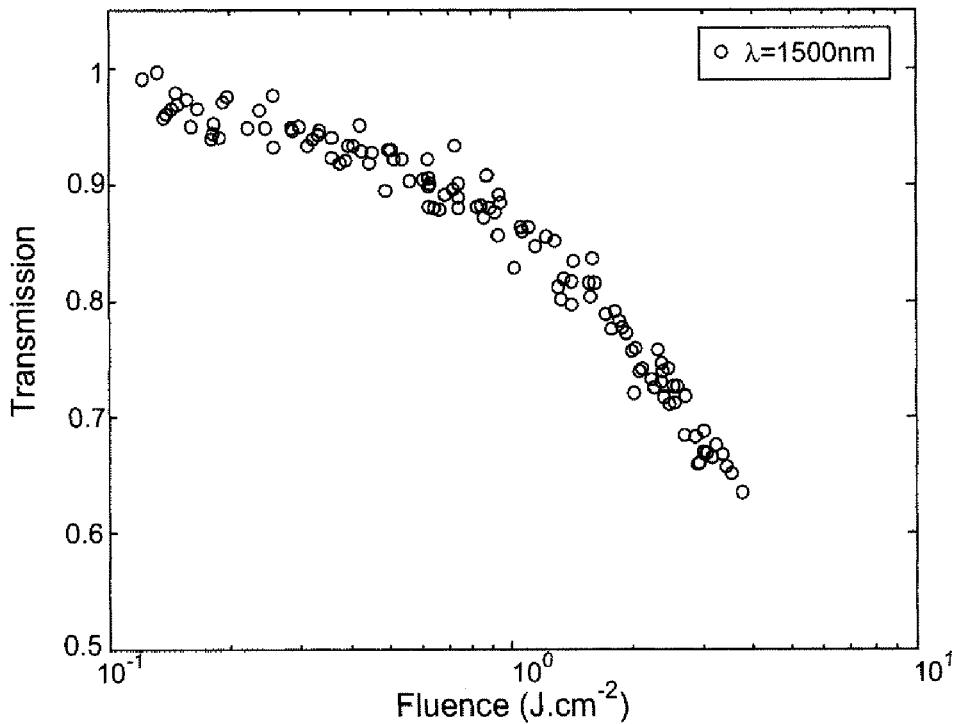

Measurements of the nonlinear transmission in DCM were carried out on the compound B3, with an incident laser operating in ns mode with a fluence equal to 2 J·cm$^{-2}$. An optical limitation phenomenon was observed between 1350 and 1600 nm: an attenuation of about 40% was measured at 1500 nm as shown in FIG. 7. It is limited by the power of the incident laser and not by the efficacy of the product.

This absorption phenomenon is interpreted on the basis of a three-photon absorption model. In our case, the TPA phenomenon is followed by re-absorption in the excited state: there is in fact absorption of "two plus one" photons.

This material may be used in liquid solution, or as a bulk material:
  by doping a polymer film,
  as the active part of a monomer for producing an active polymer film,
  by doping a matrix of the sol-gel type,
  as the active part of a matrix of the sol-gel type,
  as a crystal,
  as nanocrystals dispersed in a solid matrix (sol-gel or polymer).

It is used as bulk material 10 of a passive optical limiter 1 shown in FIG. 8. The limiter obtained is insensitive to polarization (except in crystalline form), responds to pulses with a duration of a few ns and has an extended protective dynamic range (ratio between the luminous energy density necessary for obtaining a given attenuation—for example 20%—and the luminous energy density at the optical damage threshold of the material), which generally involves a high concentration of these molecules B0 or B2 or B3.

This limiter is arranged in a passive optronic system in order to protect it against laser attacks, or in an active optronic system in order to protect it against laser attacks and against auto-glare. A plurality of configurations are envisaged; these will be described in connection with FIG. 8.

Figure 8A:
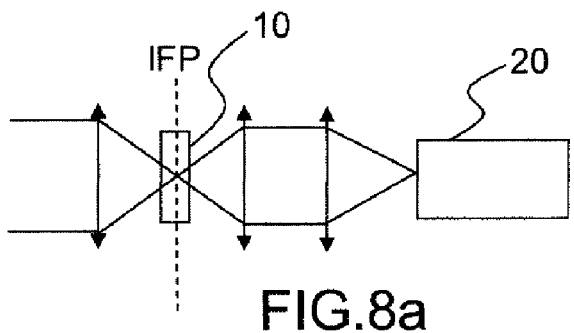
FIG. 8b schematically represents another positioning of a limiter with respect to the detector of an optronic system.
FIG. 8c schematically represents yet another positioning of a limiter with respect to the detector of an optronic system.
FIG. 8d schematically represents yet again another positioning of a limiter with respect to the detector of an optronic system.
Figure 8B:
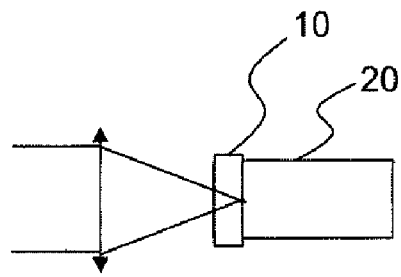
Figure 8C:
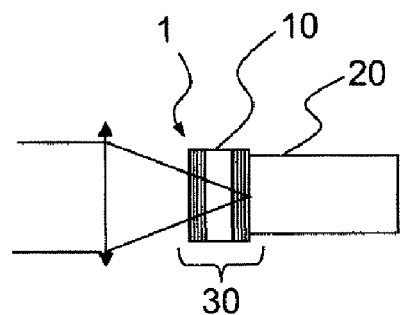
Figure 8D:
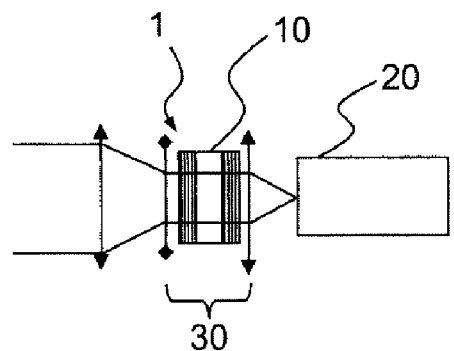

The material 10 may be placed upstream of the detector 20, in an intermediate focal plane IFP (FIG. 8*a*), or it may be deposited on the surface of the detector 20 so as to benefit from the concentration of the luminous flux while avoiding the production of an intermediate focal plane (FIG. 8*b*). In view of the small spectral band of the optical systems for which these protections are intended, the material 10 may be placed within a resonant structure 30 (structure of thin films or photonic crystal) with a view to increasing the nonlinear absorption effects (FIGS. 8*c* and 8*d*). In the latter configuration, as a function of the angular tolerance of the limiter 1, it may be placed directly in front of the detector (FIG. 8*c*) or in a collimated beam (FIG. 8*d*), upstream of it.

The following two thin-film structures may be mentioned as examples of a resonant optical structure. A multilayer structure with three cavities of the type:

X (A) LL (A) L (A) N (A) L (A) LL (A), or X'(A') HH (A') H (A') N (A') H (A') HH (A')

where $(A)=(LH)^n$ is a "Bragg mirror" having 2n layers, with n>1

$(A')=(HL)^{n'}$ is a "Bragg mirror" having 2n' layers, with n'>1

L describes a layer with an optical thickness $\lambda/4$ having a low refractive index, $\lambda$ being the absorption wavelength of the limiter, H describes a layer with an optical thickness $\lambda/4$ having a high refractive index, N describes a layer with an optical thickness $\lambda/2$ composed of a material 10 exhibiting nonlinear absorption, X and X' are apodization layers (typically 1 to 3 layers of high and low index), the thickness of which is not necessarily a multiple of $\lambda/4$.

The layer L is for example a layer of $SiO_2$, and the layer H is for example a layer of $Ta_2O_5$ or $TiO_2$.

The latter type of optical structure is already used in the field of telecommunications without a nonlinear layer, and makes it possible to obtain a spectral response having steeper edges then a single cavity while maintaining a sufficient spectral/angular acceptance.

With a view to reducing the triggering threshold of the limiter, it may be advantageous to use a resonant structure which is of the same type as those described above, but is spectrally off-centred relative to the operating wavelength of the optical system. The triggering threshold of the filter can thus be reduced as a function of the spectral off-centring with respect to the operating wavelength of the equipment. This is because, as explained above, the coupling between the cavities makes it possible to obtain a high transmission over a spectral range wider than that obtained for a single cavity. By selecting a design wavelength of the filter which is slightly offset relative to the operating wavelength of the active imaging equipment, the optical structure of the filter will be slightly imbalanced. In the previous example, the coupling between the three cavities is slightly less: the transmission decreases slightly but above all the structure is commensurately more sensitive to a variation in index/absorption. A change of index (or absorption) in one of the cavities will lead to decoupling of the three cavities, and therefore an abrupt decrease in the transmission. This decrease will occur more rapidly when the operating wavelength of the active imaging system is closer to the edge of the transmission filter spectrum of the filter (in linear or cold filter mode).

The invention claimed is:

1. A passive optical limiter comprising a nonlinear material capable of switching in a predetermined optical band from a transparent state to an opaque state as a function of the power of an incident laser beam, wherein the nonlinear material is an organic dye which comprises aza-bodipy molecules derived from 4,4-difluoro-4-bora-3a,4a-diaza-s-indacene into which a nitrogen atom is inserted at the meso position and which have conjugated $\pi$ chains functionalized so as to exhibit absorption for two photons around an incident beam wavelength lying between 1.45 µm and 1.6 µm.

2. A passive optical limiter according to claim 1, wherein the conjugated $\pi$ chains functionalized by aromatic electron donor or acceptor groups are introduced into the aza-bodipy molecules at position 1,7 or 3,5.

3. A passive optical limiter according to claim 2, wherein the aromatic groups are $NMe_2$, or OHex or $NHex_2$ at position 3,5.

4. A passive optical limiter according to claim 2, wherein the functional groups are alkoxyphenyl or dialkylaniline or dialkylaminofluorenyl.

5. A passive optical limiter according to claim 2, wherein the donor groups are different.

6. A passive optical limiter according to claim 1, wherein heavy atoms are introduced into the aza-bodipy at position 2,6.

7. A passive optical limiter according to claim 6, wherein the heavy atoms are halogens.

8. A passive optical limiter according to claim 7, wherein the heavy atoms are Cl or Br or I.

9. A passive optical limiter according to claim 1, wherein the aza-bodipy molecules are functionalized by a reactive hydroxyl or amino or trimethylsilyl function.

10. A passive optical limiter according to claim 1, wherein the dye is used in liquid solution or as bulk material obtained by doping a polymer film, or as the active part of a monomer for producing an active polymer film, or by doping a matrix of the sol-gel type, or as the active part of a matrix of the sol-gel type, or as a crystal, or as nanocrystals dispersed in a polymer or sol-gel matrix.

11. A passive optical limiter according to claim 10, further comprising an optical structure (30) with a resonant cavity, in the middle of which the said aza-bodipy used as bulk material is deposited.

12. A passive optical limiter according to claim 11, wherein the optical structure with a resonant cavity is a photonic crystal, in the middle of which is deposited the said aza-bodipy used as a dopant of a matrix in which the photonic crystal is produced.

13. A passive optical limiter according to claim 12, wherein the optical structure with a resonant cavity is a multilayer structure comprising a plurality of coupled resonant cavities as well as a layer exhibiting a nonlinear response.

14. A passive optical limiter according to claim 13, wherein the multilayer optical structure is a structure with K cavities, which has Bragg mirrors with M layers, each layer having an optical thickness equal to $\lambda/4$ or a multiple of $\lambda/4$, $\lambda$ being the wavelength of the incident beam, with M>2.

15. A passive optical limiter according to claim 14, wherein the multilayer optical structure is of the type X (A) LL (A) L (A) N (A) L (A) LL (A), where (A) is a Bragg mirror with 2n layers of the type $(LH)^n$, where L and H respectively describe a layer of optical thickness $\lambda/4$ having a low refractive index and a high refractive index, N describes a layer of the said dye with an optical thickness $\lambda/2$, X describes an apodization layer and n>1.

16. A passive optical limiter according to claim 15, wherein the layer L is a layer of $SiO_2$ and the layer H is a layer of $Ta_2O_5$ or $TiO_2$.

17. A passive optical limiter according to claim 14, wherein the multilayer optical structure is of the type X (A) HH (A) H (A) N (A) H (A) HH (A), where (A) is a Bragg mirror with 2n' layers of the type $(HL)^{n'}$, where L and H respectively describe a layer of optical thickness $\lambda/4$ having a low refractive index and a high refractive index, N describes a layer of the said dye with an optical thickness $\lambda/2$, X describes an apodization layer and n'>1.

18. An optronic system which comprises a reception device equipped with a limiter according to claim 1.

19. An optronic system according to claim 18 claim, further comprising a device for emitting a laser beam having a wavelength of between 1.45 and 1.6 μm, and in which the limiter is adapted to be blocking around the said wavelength.

20. An active optronic system according to claim 19, wherein, the reception device having a detector located in a focal plane, the nonlinear material is placed in an intermediate focal plane or in a collimated beam.

21. An optronic system according to claim 18, wherein, the reception device having a detector, the nonlinear material is deposited on the surface of this detector.

* * * * *

UNITED STATES PATENT AND TRADEMARK OFFICE
CERTIFICATE OF CORRECTION

| | | |
|---|---|---|
| PATENT NO. | : 8,228,584 B2 | Page 1 of 1 |
| APPLICATION NO. | : 12/706930 | |
| DATED | : July 24, 2012 | |
| INVENTOR(S) | : Gerard Berginc et al. | |

It is certified that error appears in the above-identified patent and that said Letters Patent is hereby corrected as shown below:

Title page, Item [73]

Please add the following Assignee and Assignee's Residence:

--Thales--   --Neuilly-Sur-Seine, France--
--Centre National De La Recherche Scientifique--   --Paris, France--

Signed and Sealed this
Twenty-first Day of May, 2013

Teresa Stanek Rea
*Acting Director of the United States Patent and Trademark Office*